Sept. 8, 1953

G. W. VON HOFE 2,651,429

LABEL APPLYING MECHANISM

Filed Dec. 21, 1950

INVENTOR.
GEORGE W. VON HOFE
BY John J. Hart
ATTORNEY

Patented Sept. 8, 1953

2,651,429

UNITED STATES PATENT OFFICE 2,651,429

LABEL APPLYING MECHANISM

George W. von Hofe, Bound Brook, N. J., assignor to New Jersey Machine Corporation, Hoboken, N. J., a corporation of New Jersey Application December 21, 1950, Serial No. 202,001

8 Claims. (Cl. 216—55)

Figures 1, 2, 3, 4:
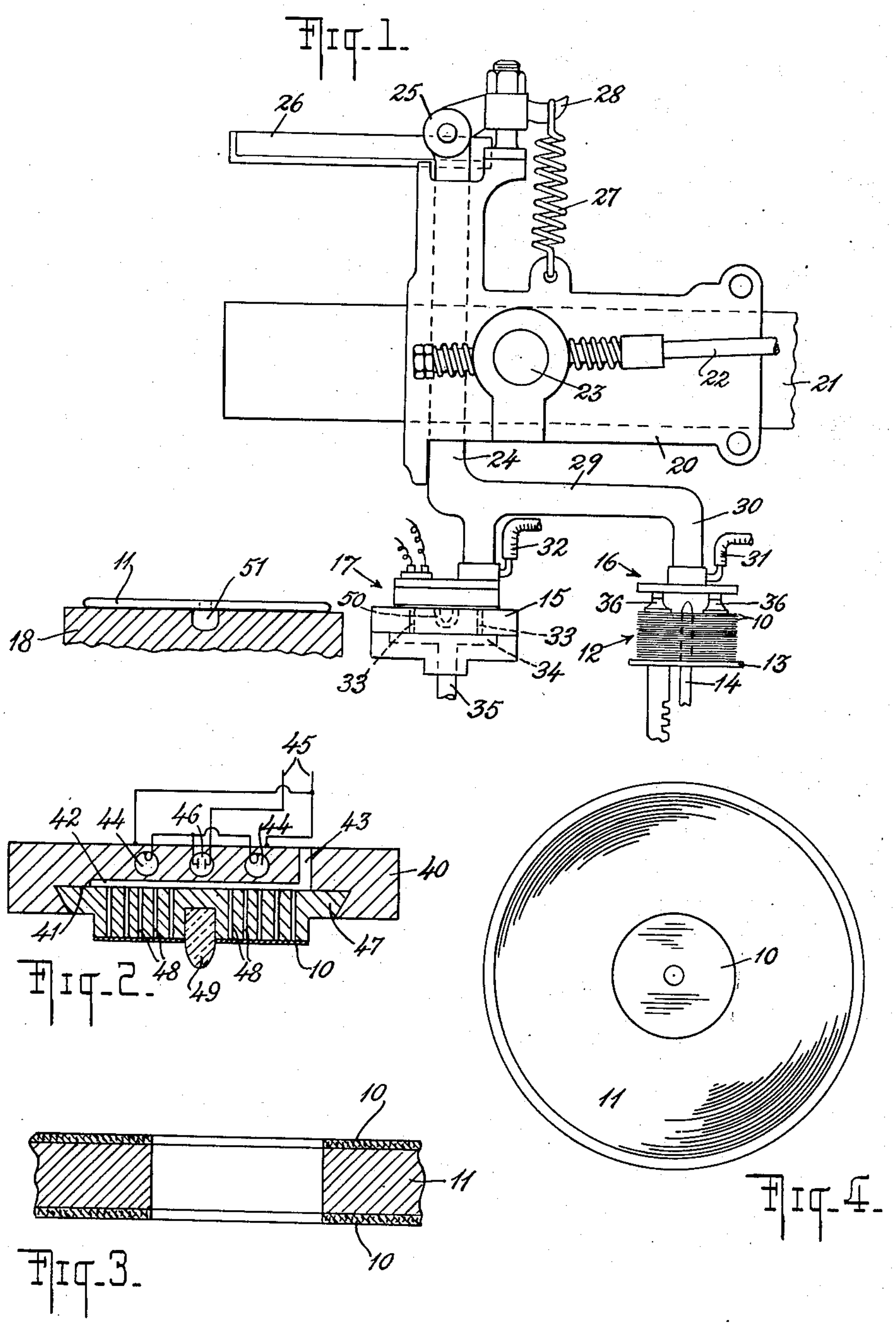

This invention relates to label applying machines and has for its primary object the provision of an improved means for applying with precision on an article surface, a label of interrupted area, such as the annularly-shaped labels applied to phonograph records.

Another object of the invention is to provide an improved means capable of applying a heated thermoactivatable adhesive label on a phonograph record made of thermoplastic materials without excessive heating of the latter.

Another object of the invention is to provide an improved means which will apply an annular label in precise registry with the locating hole in the center of a phonograph disc so that there will be no portion of the label overlapping such hole to interfere with the operation of automatic record changers.

A further object of the invention is to provide an improved means capable of precisely registering an annular label on a phonograph disc by utilizing in such registering operation the hole in the record and the hole in the label.

A still further object of the invention is to provide an improved means capable of registering an annular label on a phonograph disc in proper relation to the hole in the latter without the necessity of having on the phonograph disc supporting means, objectionable pin locating means which might damage the disc and interfere with the apparatus feeding the same to such supporting means.

A still further object of the invention is to provide an improved means of the type indicated, in which the same device which registers the label on the label carrying means thereof, also registers the label on the phonograph record.

Other objects of the invention, as well as the novel features of construction thereof, will appear from the following description when read in connection with the accompanying drawings, in which Fig. 1 is a diagrammatic view, partly in section, illustrating one manner in which the invention may be utilized; Fig. 2 is a vertical sectional view of a suction transfer head embodying the features of the invention; Fig. 3 is a sectional view of the central portion of a labelled phonograph disc and Fig. 4 is a plan view of a labelled phonograph disc.

In the drawings, the reference numeral 10 indicates generally the label to be applied to a phonograph disc 11. The label is of annular form having a centrally located hole similar in size to the usual hole in the record 11. On one side of the label 10 is provided a coating of thermoactivatable adhesive material which, when properly heated, will enable the label to adhere to a surface of the record. In the form of the invention disclosed, the labels 10 are formed into an upright stack 12 on a support 13 to which is connected any conventional elevating means for raising the stack 12 of labels at periodic intervals to thereby restore the top label in the stack to a predetermined height, and thus maintain the top labels at a substantially constant feeding level. Extending through the central portion of the support 13 is an adjustable label registering pin 14 which passes upwardly through the holes in the centers of the labels to a point slightly above the uppermost label in the stack when the support 13 is in its lowermost position to receive a stack of predetermined height. It will be understood, that as the support 13 is raised by the elevating means, the pin 14 remains stationary so that the upper end of the pin is always in the same position relative to the topmost label throughout the range of upward movement of the support 13.

In accordance with the invention, the labels 10 are fed from the stack or store thereof on the support 13 which may be stated to be the source of label supply to a support 15 by means of a pick-up device of the suction-operated type which is designated generally in the drawings by the numeral 16. After a label 10 has been deposited upon the support 15, a label carrier or transfer device, designated generally by the numeral 17, transfers the label from such support 15 to the phonograph record 11 mounted on a suitable support, such as for example, the article supporting means designated 18 in Fig. 1 of the drawings. Inasmuch as in this machine, the labels to be applied to the article by the transfer device 17 are obtained from the support 15 to which they are successively fed by the pick-up device 16, such support 15 may be considered as constituting a label supply or transfer station for the labels so transmitted to the articles.

The label applying machine in which the above mentioned devices are embodied, may be of any well-known type and for the purposes of illustrating the invention, such parts have been shown as embodied in a labeling machine, such as is described and illustrated in the von Hofe Patent No. 2,227,816 issued January 7, 1941. In such a machine, there is provided a carriage 20 (note Fig. 1), slidably mounted on a horizontal guide rail 21 supported on the frame of the machine. The carriage 20 is reciprocated lengthwise of the rail 21 in predetermined time sequence by mechanism exemplified in Fig. 1 of the drawings, by the rod 22, which is pivotally connected at 23 to the carriage. A member or plunger 24 is slidably mounted on the carriage 20 and is vertically reciprocated thereon in properly timed relation with the associated parts by mechanism exemplified in Fig. 1 of the drawings by the roller 25 which is adapted to travel along a horizontally-extending track 26 which is arranged to be raised and lowered to reciprocate the member 24. The downward movement of the member 24 may be facilitated by a vertically-disposed spring 27 which is connected at its lower end to the carriage 20 and at its upper end to a lug 28 on the member 24. The spring 27 however, may be omitted in some instances and gravity alone depended upon to accomplish the downward movement of the member 24 when the track 26 is lowered. Secured to the lower end of the member 24 is the label carried or transfer device 17. Also supported in predetermined spaced relation to the transfer device 17 on the member 24 is the pick-up or label feed device 16. The pick-up device may be mounted in any suitable fashion on the member 24, as by a supporting bracket 29 integrally connected at one end to the member 24 and provided at its other end with a depending portion 30, to the lower end of which is secured the pick-up device 16.

It will be understood from the parts of the label machine thus far described, that when in the operation of the machine, the parts are positioned as shown in Fig. 1, the track 26 is in a lowered position, the pick-up device 16 is in position to pick up a label from the stack or store 12 of labels 10, and the transfer device 17 is in a position to receive a label 10 which has been deposited on the support 15 in the previous operation of the carriage 20. Both the devices 16 and 17 are of the suction type and are connected by tubes 31 and 32, respectively, with a convenient source of suction which is controlled by properly timed valving means of any suitable type so that suction is affected at the label supporting surfaces of such devices while they are positioned as shown in Fig. 1 and until just before the labels carried thereby have been deposited on the support 15 and the article 11, as will hereinafter appear more clear. When a label 10 has been drawn from the stack 12 by the pick-up device 16 and a label has been taken from the support 15 by the transfer device 17, the track 26 is raised to elevate the member 24 and consequently the devices 16 and 17 with the labels thereon. The carriage 20 is then caused to move to the left, as viewed in Fig. 1 of the drawings, to bring the pick-up device 16 over the support 15 and the transfer device 17 over the article 11 which has previously been placed on the support 18 in label receiving position.

The spacing of the stack support 13, support 15 and support 18 is correlated with relation to the spacing of devices 16 and 17 on the member 24 to bring the parts accurately into the positions above described. When the parts are in the said positions, the track 26 is lowered and the member 24 moves downwardly on the carriage 20 to thereby cause the pick-up device 16 to deposit the label carried thereby on the support 15 and to cause the transfer device 17 to deposit its label upon the article 11. Just prior to the depositing of the labels on the support 15 and the article 11, the suction in the devices 16 and 17 is discontinued. Following such depositing of the labels, the devices 16 and 17 are lifted with respect to the carriage 20 by the action of track 26 on the roller 25 and member 24. The labelled article 11 is then removed from or turned upside-down on the support 18, and the carriage 20 is retracted to bring the parts back to the positions shown in Fig. 1 of the drawings to repeat the operations above described.

In carrying out the above described sequence of operations, the valving means controlling the suction in the devices 16 and 17 is so timed that during the retracting movement of such devices and until the label supporting surfaces of device 16 are again in contact with a label on the support 13 and the label supporting surface of the device 17 is poised just above a label on the support 15, the suction on such devices is discontinued. Upon the attaining of such positions of the label supporting surfaces of the devices 16 and 17 however, suction is provided in such devices to hold the labels to the label supporting surfaces thereof, and such suction is maintained during the next advancing movement of such devices and until such devices are just above, but in spaced relation to the support 15 and the article on support 18. The label carrying surface of the support 15 is provided with a plurality of perforations or air vents which communicate by means of passages 33, with a chamber 34 formed within such support. The chamber is connected by means of a tube 35 with a source of air supply. Suitable valve means are provided to control the air supply to the chamber 34 so as to provide a condition of suction in such chamber and consequently at the label carrying surface of the support 15 when a label is delivered to such surface by the label pick-up or feeding device 16 and until such label is to be delivered to the transfer device 17. The valve means is also constructed and arranged to deliver compressed air into the chamber 34 to blow the deposited label 10 into contact with the label carrying surface of the transfer head 17 when the latter is properly positioned in label receiving position with relation to the support 15. Due to the fact that a label on support 15 is deposited thereon so that its thermoplastic coating is in engagement with the label carrying surface of such support and the fact that the label carrying surface of the transfer device 17 is heated, as will hereinafter be explained, the label carrying surface of the transfer device does not contact with the label on the support, but in the pick-up position of such device, is slightly spaced therefrom, as has been previously explained, to prevent the label's adherence to the support.

The label carrying surface of the pick-up device 16 is of such form as to enable it to engage with the topmost label in the stack 12 without interfering with the pin 14 extending through such labels. As is shown in Fig. 1 of the drawings, such label carrying surface may be formed by means of a plurality of suction cups 36, so arranged on device 16 as to be spaced from the pin 14 and to engage portions of the topmost label 10 spaced from the central hole thereof. The suction cups 36 are of such depth that the device 16 will not engage with the upper end of the pin 14 when the mouths thereof are engaging the topmost label and are connected by passageways in the body of the device 16 to the tube 31.

As is shown more clearly in Fig. 2 of the drawings, the suction head 17 comprises a main body portion or plate 40 provided at its lower end with a dove-tailed seat which extends centrally between the ends of the plate and transversely of the suction head's path of travel between support or station 15 and the label applying station. Formed in the upper surface 41 of the dove-tailed seat is a recess 42 having predetermined dimensions and shape; the same being determined in part by the surface area of the largest label which the head is designed to carry. The recess 42 is connected by a passageway 43 formed in the upper portion of plate 40 and the plunger 24, to the tube 32. The plate 40 carries a heating device composed of a pair of electrical resistance elements 44, 44, which are connected with a source of electricity by the wires 45, and which are controlled by a thermostat 46 to maintain the plate 40 at a predetermined temperature.

Fitted in the dove-tailed seat of the plate 40 is a dove-tailed metal plate 47 whose lower end of reduced area projects below the bottom surface of the plate 40 and whose upper surface closes the lower open end of the recess 42 to form a suction chamber. Extending through the plate 47 are a multiplicity of transverse, vertically-disposed passageways 48 which are in communication with the suction chamber and which terminate at the lower face of the plate 47. Centrally mounted in plate 47 is a pin 49 which projects downwardly therefrom, a distance greater than the thickness of the phonograph disc 11. Pin 49 is preferably made of a heat insulatable material such as Bakelite or compressed asbestos, so that it does not absorb a substantial portion of the heat in plates 47 and maintains a temperature substantially conforming to that of room temperature. It will be understood however, that pin 49 may be made of any other material and may not be solid but provided with one or more passageways therethrough, and through plate 47 to the suction chamber 42, so that air at room temperature passes through such pin while suction is applied at chamber 42 to maintain such pin at a temperature substantially less than that of plate 47. The downwardly projecting end of pin 49 for a portion of its length preferably has a cross-sectional area substantially the same as the area of the holes on the labels 10 and the phonograph discs 11. The remaining outer portion of pin 49 is of tapered configuration terminating in a rounded outer end as can be seen more clearly in Fig. 2 of the drawings. Provided in supports 15 and 18 are recesses 50 and 51, respectively, having a depth greater than the length of the projecting portion of pin 49 and a cross-sectional area, substantially greater than the cross-sectional area of such portion of pin 49 and adapted to receive such pin when the suction device 17 is lowered to such supports in the operations of the machine.

It is believed that an understanding of the operation of the invention will be obtained from the above description, but it may be advisable to point out that when a label 10 is deposited on the label supporting surface of support 15, the suction effective at such surface will cause the label to adhere thereto. When the transfer device 17 is lowered to the point where the pin 49 thereof has partially entered the hole in the label, suction at the surface of support 15 will be discontinued. Thus, as the transfer device continues its downward movement with the pin 49 passing through the hole in the label, the label will be shifted by the tapered sides of pin 49 to properly register it with the label carrying surface of such device, if the label is not already in that condition. The pin 49 passes through the label and into recess 50 of support 15 until the label carrying surface of device 17 is poised just above and in spaced relation to the exterior face of the label. Compressed air will thereupon be passed through tube 35, chamber 34 and the air passages 33 to blow the label into contact with the spaced lower surface of plate 47 of device 17 where it will be held by the suction effective at such surface at that time. The transfer device 17 with the label thereon, will then be lifted from the support 15, shifted by the carriage 20 over the record disc 11 on support 18 and then lowered to deposit the label upon the record disc. During the travel of the transfer device 17 from support 15 to the record 11, the label 10 carried thereby is heated by the heating means 44 in plate 40 thereof to adhesively activate the thermoplastic coating on such label. Consequently, when the transfer device 17 is lowered at the applying station to bring the label 10 with its heat activated thermoplastic coating into engagement with the upper surface of the phonograph disc 11, the label will be caused to adhere to such surface of the disc. In the descent of device 17 at such label applying station and when its downward movement has reached the point where the pin 49 has just engaged the hole in the record 10, the suction in said device is discontinued. As the device 17 continues its downward movement, if the disc and label are not in proper registry, the tapered sides of the pin 49 on such device, will shift the record 11 to bring them into proper registry. As the device 17 ends its downward movement with the pin passed through the record 11 and projecting into the recess 57 of support 18, the upper projecting portion of such pin, which is of an area to snugly fit the holes in the label and record disc, will bring the edges of such holes into precise registration with no overlapping of the label on the hole of record 11. The lower face of plate 47 on the device 17 will then press the label into adhesive connection with the upper surface of the record disc 11. The transfer device 17 is then returned to support 15 in the manner previously described to transfer another label from such support to the opposite side of the record or to a new record 11.

While I have hereinabove described and illustrated in the accompanying drawings a preferred embodiment of my invention, it will be obvious to those skilled in the art that various changes and modifications may be made therein without departing from the spirit of the invention or the scope of the appended claims. Thus, while it is believed that the aperture 51 of support 18 is sufficient to serve not only to receive the pin 49 as a label is applied to a record, but also as a guide for placing records on such support, additional guide means may be provided on support 18 to postion a record in approximately accurate position on such support without interfering with any shifting action of such record caused by pin 49 as the transfer device 17 is lowered to apply a label thereto.

I claim:

1. In a labeling machine having means at a label applying station for supporting in shiftable relation thereon an article to be labeled having an opening in a surface thereof, a label carrier having a label carrying surface and a projecting label registering member located within the area of said surface, said registering member being adapted to extend through an aperture of a label carried by said surface to properly register such label on such surface and at said applying station to coact with the opening in the surface of the shiftable article to bring the article and the label on such carrying surface into proper registry, means for heating said label carrying surface, and means for maintaining said registering member at a lower temperature than said heated label carrying surface.

2. In a labeling machine having means at a label applying station for supporting in shiftable relation thereon an article to be labeled having an opening in the surface thereof, means spaced from such station for supporting apertured labels having thermo-activatable adhesive coatings in unactivated condition, means for feeding labels from said label support to said article support, said feeding means comprising a vacuum device having a label carrying surface, means for heating said surface to activate the adhesive coating of a label supported on said carrying surface, a registering member mounted on said device within the area defined by said carrying surface and projecting therefrom to extend through an aperture in a label supported on said carrying surface and properly register such label on the latter, and means for moving said device from a position adjacently spaced from said label support toward said article support to cause said registering member to move through the opening in the surface of the shiftable article to be labeled, and means at said label support for delivering a label to the carrying surface of said device with the registering member projecting through the aperture of the label, said registering means coacting with the opening in the surface of the article to bring the article and label into proper registry and said device moving means being operative to cause the heated carrying surface of said device to press the registered label into contact with such registered surface of the article.

3. In a labeling machine having means at a label applying station for supporting in shiftable relation thereon, an article to be labeled having an opening in the surface thereof, means spaced from such station for supporting labels having apertures therein, and means for feeding labels from said label support to said article support, said feeding means comprising a vacuum device having a label carrying surface, and downwardly projecting label registering means on said device and adapted to extend through an aperture in a label supported on said carrying surface to properly register such label on such surface, said registering means at said applying station coacting with the opening in the surface of the shiftable article to bring the article and the label on such carrying surface into proper registry.

4. In a labeling machine having means at a label applying station for supporting in shiftable relation thereon, an article to be labeled having an opening in the surface thereof, means spaced from such station for supporting labels having apertures therein, and means for feeding labels from said label support to said article support, said feeding means comprising a vacuum device having a label carrying surface, and a downwardly extending projection mounted on said device within the area defined by said carrying surface and adapted to extend through an aperture in a label supported on said carrying surface to properly register such label on such surface, said registering projection at said applying station coacting with the opening in the surface of the shiftable article to bring the article and the label on such carrying surface into proper registry.

5. A labeling machine such as defined in claim 4, including means for heating the label carrying surface of said vacuum device, and in which the projection mounted on said vacuum device is constituted of non-heat conducting material.

6. A labeling machine such as defined in claim 4, in which the projection on said vacuum device is tapered at its outer projecting end, the said taper converging outwardly smoothly and uninterruptedly from the body of such projection, and said projection from such tapered end to the label carrying surface of said vacuum device being of such area as to snugly fit both the aperture in the label and the opening in the surface of the article, whereby said projection is enabled to bring the article and the label into precise registration and while the latter are so precisely registered enabling the label carrying surface of said device to press the label into contact with the article.

7. In a labeling machine, a label carrier having a projection thereon to register a label in proper relation on such carrier, a support for carrying in shiftable relation thereon an article to be labeled having an opening in the surface thereof, and means to move said label carrier relative to said article support to enable the projection on said carrier to engage the opening in the surface of a shiftable article on said support and to bring such article into proper registry with a label supported by said label carrier.

8. In a labeling machine, a label carrier having a label carrying surface and a projecting registering member located within the area of said surface to properly register an apertured label on such surface, a support for supporting in shiftable relation thereon an article having an aperture therethrough and having a recess with which the aperture in said article is to be substantially aligned, a support for supporting in shiftable relation thereon a label having an aperture therethrough and having a recess with which the aperture in said label is to be substantially aligned, and means for moving said label carrier to cause said registering member to move through the aperture of a shiftable label on said label support and into the recess of said support to bring such label into proper registry with the carrying surface of said carrier and then to move said registering means through the aperture of a shiftable article on said article support and into the recess on said article support to bring the article into proper registry with the label and to enable the label to be applied to the registered article by said carrier, the recesses in said label and article supports being of such size and form as to permit such operations of said carrier and registering member without restriction.

GEORGE W. VON HOFE.

References Cited in the file of this patent

UNITED STATES PATENTS

| Number | Name | Date |
|---|---|---|
| 2,178,979 | Von Hofe et al. | Nov. 7, 1939 |
| 2,300,185 | Von Hofe | Oct. 27, 1942 |
| 2,425,347 | Schmitt | Aug. 12, 1947 |
| 2,492,908 | Von Hofe | Dec. 27, 1949 |
| 2,528,296 | Baron et al. | Oct. 31, 1950 |
| 2,578,329 | Von Hofe | Dec. 11, 1951 |